(12) United States Patent
Chou

(10) Patent No.: US 8,172,203 B2
(45) Date of Patent: May 8, 2012

(54) AUXILIARY MEMBER FOR RATCHET BUCKLE

(75) Inventor: Yeh-Chien Chou, Taoyuan Hsien (TW)

(73) Assignee: Strong Yun Industrial Co., Ltd., Taoyuan Hsien (TW)

( * ) Notice: Subject to any disclaimer, the term of this patent is extended or adjusted under 35 U.S.C. 154(b) by 187 days.

(21) Appl. No.: 12/748,597

(22) Filed: Mar. 29, 2010

(65) Prior Publication Data

US 2011/0233317 A1    Sep. 29, 2011

(51) Int. Cl.
*B21F 9/00* (2006.01)
(52) U.S. Cl. .................... 254/225; 242/388.4
(58) Field of Classification Search ........... 254/217, 254/218, 225; 242/388, 388.1, 388.2; 24/68 R, 24/69 ST, 69 CT, 71 ST
See application file for complete search history.

(56) References Cited

U.S. PATENT DOCUMENTS

| | | | | | |
|---|---|---|---|---|---|
| 4,301,977 | A | * | 11/1981 | Yang | 242/375.3 |
| 4,311,288 | A | * | 1/1982 | Galland | 242/532.6 |
| 4,390,141 | A | * | 6/1983 | Webster | 242/404.2 |
| 4,913,608 | A | * | 4/1990 | Royball | 410/103 |
| 5,033,690 | A | * | 7/1991 | McIver | 242/532.6 |
| 5,611,520 | A | * | 3/1997 | Soderstrom | 254/218 |
| 5,993,127 | A | * | 11/1999 | Shinn | 410/100 |
| 6,102,371 | A | * | 8/2000 | Wyers | 254/218 |
| 6,820,862 | B2 | * | 11/2004 | Terzagi | 254/223 |
| 7,004,422 | B1 | * | 2/2006 | Chen | 242/588 |
| 7,100,901 | B2 | * | 9/2006 | Gleinser | 254/218 |
| 7,296,326 | B2 | * | 11/2007 | Madachy et al. | 24/68 CD |
| 7,766,271 | B1 | * | 8/2010 | Confoey | 242/395 |
| 7,861,382 | B1 | * | 1/2011 | Madachy et al. | 24/68 CD |

* cited by examiner

*Primary Examiner* — Emmanuel M Marcelo

(57) ABSTRACT

An auxiliary member for a ratchet buckle includes a U-shaped frame, a shank; two plastic bushes, a levering set, a holder, and a bolt set, wherein central sections of two sides of the frame connect with the shank axially, one end of the shank couples with the levering set, and open ends of the two sides of the frame connect with a body of the buckle by using the bolt set, such that the belt can be pulled while in use and rolled while in no use easily, and used to fix merchandises securely during transporting process.

10 Claims, 3 Drawing Sheets

US 8,172,203 B2

AUXILIARY MEMBER FOR RATCHET BUCKLE

BACKGROUND OF THE INVENTION

1. Field of the Invention

The present invention relates to auxiliary member for a ratchet buckle.

2. Description of the Prior Art

Conventional ratchet buckle with a belt is used to buckle merchandises so that the merchandises are fixed securely during transporting process.

As shown in FIG. 1, a conventional buckling assembly includes a buckle 1, two hooks 2, a belt assembly having an adjustable belt 3 and a fixed belt 4.

A body of the buckle is contacted with the vehicle, and one end the belt set is inserted onto a screw of the buckle to connect with the vehicle, and another end thereof is fixed to the vehicle, the belt is inserted through a slot of the buckle to manually lever a lever so that a key element is actuated by the lever to rotate, hence the belt assembly is rolled onto the key element, and a gear and a stop plate are used to retain the belt assembly to buckle merchandises.

However, if the belt assembly is long excessively, the belt extends outside the buckle to influence transportation safety during driving the vehicle, and when the belt assembly is not used, the adjustable belt has to be rolled onto the buckle, having a rolling operation inconveniently.

The present invention has arisen to mitigate and or obviate the afore-described disadvantages.

SUMMARY OF THE INVENTION

The primary object of the present invention is to provide an auxiliary member for a ratchet buckle which is capable of overcoming the shortcomings of the conventional an auxiliary member for a ratchet buckle.

Another object of the present invention is to provide an auxiliary member for a ratchet buckle that can pull the belt easily while in use and roll the belt while in no use easily, and be used to fix merchandises securely during transporting process.

To obtain the above objective, an auxiliary member for a ratchet buckle provided by a preferred embodiment of the present invention comprises:

a U-shaped frame, a shank, two plastic bushes, a levering set, a holder, and a bolt set, wherein central sections of two sides of the frame connect with the shank axially, one end of the shank couples with the levering set, and open ends of the two sides of the frame connect with a body of the buckle by using the bolt set.

DETAILED DESCRIPTION OF THE PREFERRED EMBODIMENTS

Figure 1:
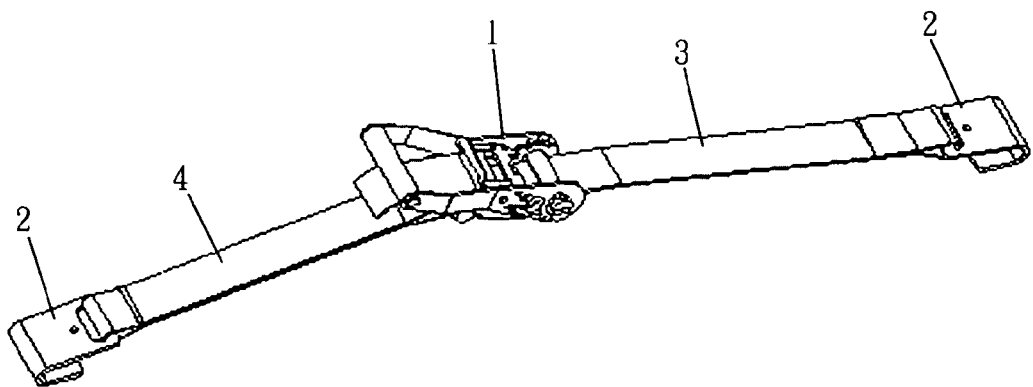
FIG. 1 is a perspective view showing the assembly of a conventional buckle.
Figure 2:
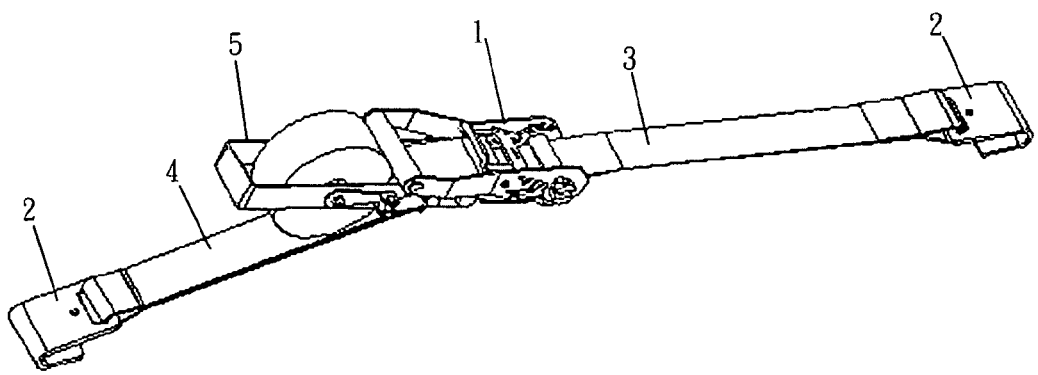
FIG. 2 is a perspective view showing the operation of an auxiliary member for a ratchet buckle in accordance with a preferred embodiment of the present invention.
Figure 3:
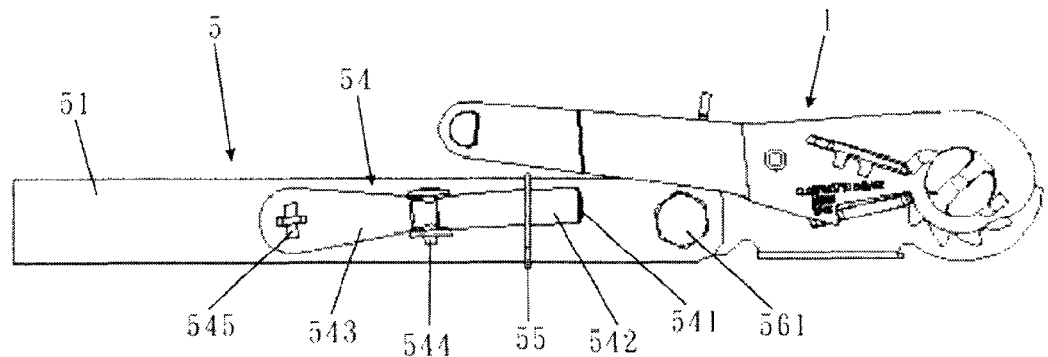
FIG. 3 is a side plan view showing the assembly of the auxiliary member for the ratchet buckle in accordance with the preferred embodiment of the present invention.
Figure 4:
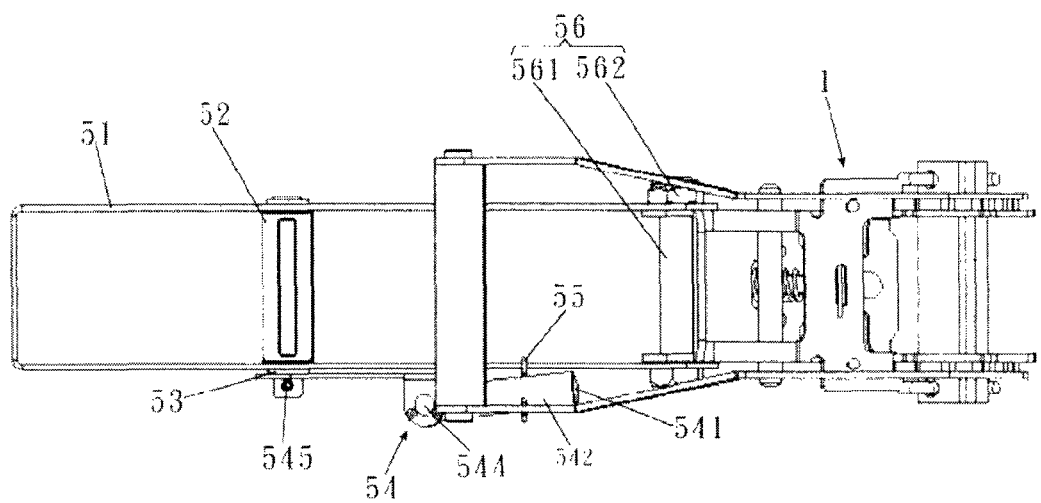
FIG. 4 is a top plan view showing the assembly of the auxiliary member for the ratchet buckle in accordance with the preferred embodiment of the present invention.
Figure 5:
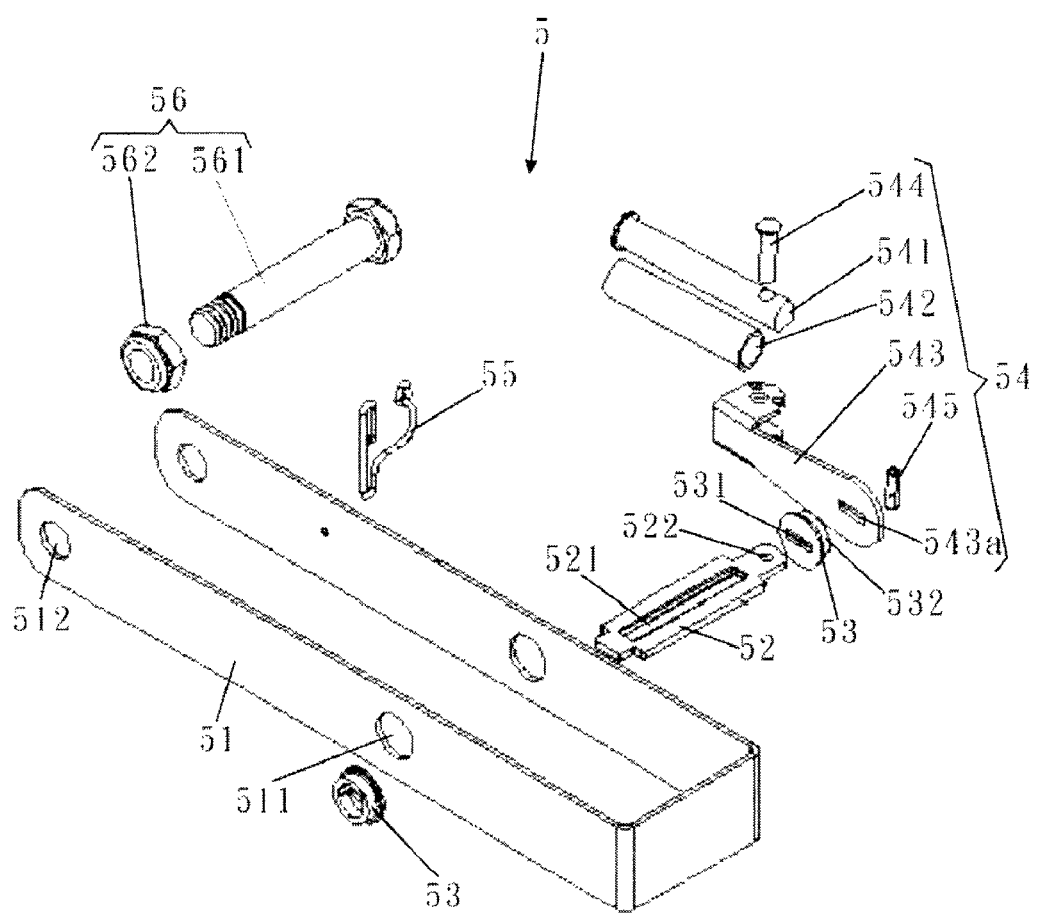
FIG. 5 a perspective view showing the exploded components of the auxiliary member for the ratchet buckle in accordance with the preferred embodiment of the present invention.

Referring to FIGS. 2-5, an auxiliary member 5 for a ratchet buckle according to a preferred embodiment of the present invention comprises a U-shaped frame 51, a shank 52, two plastic bushes 53, a levering set 54, a holder 55, and a bolt set 56, wherein the frame 51 includes two holes 511 disposed on central sections of two sides thereof respectively, and includes two apertures 512 mounted on open ends of the two sides thereof individually;

the shank 52 is formed in a rectangle shape and includes an elongated bore 521 fixed on a central portion thereof, includes a longer extending segment formed on one side thereof, and the longer extending segment of the shank 52 includes a radial orifice 522 arranged thereon;

the two plastic bushes 53, each formed in a circle shape and including an elongated opening 531 to inert the shank 52, and including a stepped disc 532 formed on an outer end surface thereof to abut against the hole 511 of the frame 51;

the levering set 54 is comprised of a lever 541, a sleeve 542, a seat 543, a retaining peg 544, and an elastic pin 545, wherein the sleeve 542 is fitted around the lever 541, and the lever 541 is fixed onto the seat 543 through the retaining peg 544, the seat 543 includes a recess 543a disposed on an increased end thereof to insert the longer extending segment of the shank 52, and the elastic pin 545 is insert to the orifice 522 so as to position the shank 52 onto the frame 51;

the holder 55 is mounted at one side of the frame 51 where the levering set 54 is located to position the lever 541;

the bolt set 56 includes a screw 561 and a nut 562 to be inserted though the apertures 512 of the frame 51 to connect with a body of the buckle.

In operation, the lever 541 of the levering set 54 is swung to actuate the shank 52 to rotate in the holes 511 of the frame 51 so that when one end of a belt is inserted to the bore 521 of the shank 52, the shank 52 rolls the belt onto a roller and further onto the frame 51, such that the belt and the frame 51 connect together, and then the lever 541 is levered into the holder 55, thereby rolling and fixing the belt securely. Furthermore, the belt is pulled easily while in use.

While we have shown and described various embodiments in accordance with the present invention, it is clear to those skilled in the art that further embodiments may be made without departing from the scope of the present invention.

What is claimed is:

1. A ratchet buckle comprising a U-shaped frame having two parallel sides, a shank, two plastic bushes, a levering set, a holder, and a bolt set, wherein the shank is pivotally disposed between the two sides of the frame, one end of the shank couples with the levering set, the bolt set is pivotally disposed between two ends of the two sides of the frame, and the shank is formed in a rectangle shape and includes an elongated bore at a central portion thereof, includes a longer extending segment formed on one side thereof, and the longer extending segment of the shank includes a radial orifice arranged thereon.

2. The auxiliary member for the ratchet buckle as claimed in claim 1, wherein the frame includes two holes for receiving the shank, and includes two apertures for receiving the bolt set.

3. The ratchet buckle as claimed in claim 2, wherein each plastic bush is formed in a circle shape and includes an elongated opening to inert the shank, and includes a stepped disc formed on an outer end surface thereof to abut against an edge of the hole of the frame.

4. The ratchet buckle as claimed in claim 1, wherein the holder is mounted at one side of the frame where the levering set is located to position the lever.

5. The ratchet buckle as claimed in claim 1, wherein the bolt set includes a screw and a nut.

6. A ratchet buckle comprising:
a U-shaped frame having two parallel sides, a shank, two plastic bushes, a levering set, a holder, and a bolt set, wherein
the shank is pivotally disposed between the two sides of the frame, one end of the shank couples with the levering set, the bolt set is pivotally disposed between two ends of the two sides of the frame, and the levering set is comprised of a lever, a sleeve, a seat, a retaining peg, and an elastic pin, wherein the sleeve is fitted around the lever, and the lever is fixed onto the seat through the retaining peg, the seat includes a recess disposed on an increased end thereof to insert a longer extending segment of the shank, and the elastic pin is insert to an orifice so as to position the shank onto the frame.

7. The ratchet buckle as claimed in claim 6, wherein the frame includes two holes for receiving the shank, and includes two apertures for receiving the bolt set.

8. The ratchet buckle as claimed in claim 7, wherein each plastic bush is formed in a circle shape and includes an elongated opening to inert the shank, and includes a stepped disc formed on an outer end surface thereof to abut against an edge of the hole of the frame.

9. The ratchet buckle as claimed in claim 6, wherein the holder is mounted at one side of the frame where the levering set is located to position the lever.

10. The ratchet buckle as claimed in claim 6, wherein the bolt set includes a screw and a nut.

\* \* \* \* \*